(12) United States Patent
Schmaling et al.

(10) Patent No.: US 11,753,156 B2
(45) Date of Patent: Sep. 12, 2023

(54) MAIN ROTOR BLADE USING INTEGRAL METALLIC CENTER BLOCK STRAP ASSEMBLY

(71) Applicant: LOCKHEED MARTIN CORPORATION, Bethesda, MD (US)

(72) Inventors: David N. Schmaling, Southbury, CT (US); James Breen Orbon, New Haven, CT (US); Pedro L. Cabrera, West Haven, CT (US); David H. Hunter, Cheshire, CT (US); John D. Carroll, Fort Worth, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 535 days.

(21) Appl. No.: 16/929,889

(22) Filed: Jul. 15, 2020

(65) Prior Publication Data

US 2022/0017216 A1  Jan. 20, 2022

(51) Int. Cl.
*B64C 27/473* (2006.01)
*B64C 27/10* (2023.01)

(52) U.S. Cl.
CPC ............ *B64C 27/473* (2013.01); *B64C 27/10* (2013.01)

(58) Field of Classification Search
CPC ........ B64C 27/473; B64C 27/10; B64C 27/48
See application file for complete search history.

(56) References Cited

U.S. PATENT DOCUMENTS

| 3,926,536 A * | 12/1975 | Ciastula | B64C 27/33 416/138 |
|---|---|---|---|
| 7,695,249 B2 * | 4/2010 | Krauss | B64C 27/10 416/134 A |
| 9,211,950 B2 | 12/2015 | Hein | |
| 2014/0255191 A1 * | 9/2014 | Jarrett | F16C 33/04 156/286 |
| 2018/0002002 A1 | 1/2018 | Baskin et al. | |
| 2018/0305003 A1 * | 10/2018 | Hunter | F16J 15/50 |
| 2018/0312249 A1 * | 11/2018 | Schmaling | B64C 27/35 |
| 2019/0009897 A1 | 1/2019 | Baskin et al. | |
| 2019/0039727 A1 | 2/2019 | Wiinikka et al. | |
| 2020/0377206 A1 * | 12/2020 | Schmaling | B64C 27/48 |
| 2020/0377209 A1 * | 12/2020 | Schmaling | B64C 27/48 |
| 2022/0340270 A1 * | 10/2022 | Hunter | B64C 27/473 |

* cited by examiner

*Primary Examiner* — Assres H Woldemaryam
(74) *Attorney, Agent, or Firm* — Foley & Lardner LLP

(57) ABSTRACT

A rotor blade assembly of an aircraft having a rotor hub including a structural member having an inboard end and an outboard end, the structural member being connectable with the rotor hub. A spar surrounds the structural member and extends at least partially along a rotor blade axis. A pitch bearing assembly supports the spar relative to the structural member. The pitch bearing assembly includes an inboard pitch bearing mounted to the inboard end of the structural member and an outboard pitch bearing mounted to the outboard end of the structural member. The rotor blade assembly additionally includes a centrifugal assembly including a centrifugal bearing disposed between the inboard pitch bearing and the outboard pitch bearing relative to the rotor blade axis.

19 Claims, 5 Drawing Sheets

MAIN ROTOR BLADE USING INTEGRAL METALLIC CENTER BLOCK STRAP ASSEMBLY

STATEMENT OF FEDERAL SUPPORT

This invention was made with government support under W911W6-19-9-0005 awarded by the United States Army. The government has certain rights in the invention.

BACKGROUND

This subject matter of this disclosure relates to a rotor system of a rotary wing aircraft, and more specifically, to a rotor blade assembly for use with a rotary wing aircraft.

Existing rotary wing aircraft, such as helicopters for example, include a rotor hub configured to rotate about an axis and having multiple rotor blade assemblies mounted thereto. Each rotor blade assembly includes a structural member, such as a flexbeam or an elastomeric CF bearing, to react CF forces from the blade into the hub assembly. The blade spar resides in the pitching frame and needs to transmit blade bending loads into the hub, which is in the non-pitching frame. A composite strap and an elastomeric thrust bearing may be used to react the centrifugal forces applied to the rotor blade and a metallic center member and elastomeric pitch bearings may be used to react to the bending forces applied to the blade. In combination, these components result in an assembly that is compact in length along the spanwise direction, and therefore limits the spacing between the pitch bearings.

BRIEF DESCRIPTION

According to an embodiment, a rotor blade assembly of an aircraft having a rotor hub including a structural member having an inboard end and an outboard end, the structural member being connectable with the rotor hub. A spar surrounds the structural member and extends at least partially along a rotor blade axis. A pitch bearing assembly supports the spar relative to the structural member. The pitch bearing assembly includes an inboard pitch bearing mounted to the inboard end of the structural member and an outboard pitch bearing mounted to the outboard end of the structural member. The rotor blade assembly additionally includes a centrifugal assembly including a centrifugal bearing disposed between the inboard pitch bearing and the outboard pitch bearing relative to the rotor blade axis.

In addition to one or more of the features described above, or as an alternative, in further embodiments the structural member includes a first arm and a second arm extending from the outboard end toward the inboard end.

In addition to one or more of the features described above, or as an alternative, in further embodiments each of the first arm and the second arm has a clevis configuration including a respective outer arm and inner arm separated by a clearance.

In addition to one or more of the features described above, or as an alternative, in further embodiments a portion of the rotor hub is receivable within the clearance.

In addition to one or more of the features described above, or as an alternative, in further embodiments the structural member includes a web that extends between the inner arm of the first arm and the inner arm of the second arm.

In addition to one or more of the features described above, or as an alternative, in further embodiments the first arm is connected to a portion of the second arm adjacent the inboard end.

In addition to one or more of the features described above, or as an alternative, in further embodiments the structural member is integrally formed with the rotor hub.

In addition to one or more of the features described above, or as an alternative, in further embodiments comprising a rotor blade secured to and supported by the structural member.

In addition to one or more of the features described above, or as an alternative, in further embodiments a distance between the inboard pitch bearing and the outboard pitch bearing measured parallel to the rotor blade axis is greater than 9.5% of a radius of the rotor blade assembly.

In addition to one or more of the features described above, or as an alternative, in further embodiments the distance between the inboard pitch bearing and the outboard pitch bearing measured parallel to the rotor blade axis is greater than 10% of the radius of the rotor blade assembly.

In addition to one or more of the features described above, or as an alternative, in further embodiments the distance between the inboard pitch bearing and the outboard pitch bearing measured parallel to the rotor blade axis is about 10.5% of the radius of the rotor blade assembly.

According to another embodiment, a rotary wing aircraft includes an airframe and a main rotor system rotatable about a rotor axis. The main rotor system includes a rotor hub and at least one rotor blade assembly affixed to the rotor hub. The at least one rotor blade assembly includes a structural member having an inboard end and an outboard end and is connectable with the rotor hub. A spar surrounds the structural member and extends at least partially along a rotor blade axis, a pitch bearing assembly supports the spar relative to the structural member; and a centrifugal assembly includes a centrifugal bearing. The centrifugal bearing is disposed inboard of a portion of the pitch bearing assembly relative to the rotor blade axis.

In addition to one or more of the features described above, or as an alternative, in further embodiments the pitch bearing assembly includes an inboard pitch bearing and an outboard pitch bearing and the centrifugal bearing is disposed inboard of the outboard pitch bearing.

In addition to one or more of the features described above, or as an alternative, in further embodiments the inboard pitch bearing is mounted to the inboard end of the structural member and the outboard pitch bearing is mounted to the outboard end of the structural member.

In addition to one or more of the features described above, or as an alternative, in further embodiments a distance between the inboard pitch bearing and the outboard pitch bearing measured parallel to the rotor blade axis is greater than 9.5% of a radius of the rotor blade assembly.

In addition to one or more of the features described above, or as an alternative, in further embodiments the structural member is integrally formed with the rotor hub.

According to another embodiment, a rotor blade assembly includes a structural member having an inboard end and an outboard end, a spar surrounding the structural member and extending at least partially along a rotor blade axis, a pitch bearing assembly supportive of the spar relative to the structural member. The pitch bearing assembly includes an inboard pitch bearing mounted to the inboard end of the structural member and an outboard pitch bearing mounted to the outboard end of the structural member. A distance between the inboard pitch bearing and the outboard pitch bearing measured along the rotor blade axis is greater than 22 inches.

In addition to one or more of the features described above, or as an alternative, in further embodiments the distance is greater than 25 inches.

In addition to one or more of the features described above, or as an alternative, in further embodiments the distance is 25.75 inches.

In addition to one or more of the features described above, or as an alternative, in further embodiments the rotor blade assembly further comprises a centrifugal assembly including a centrifugal bearing, the centrifugal bearing being disposed inboard of the outboard pitch bearing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
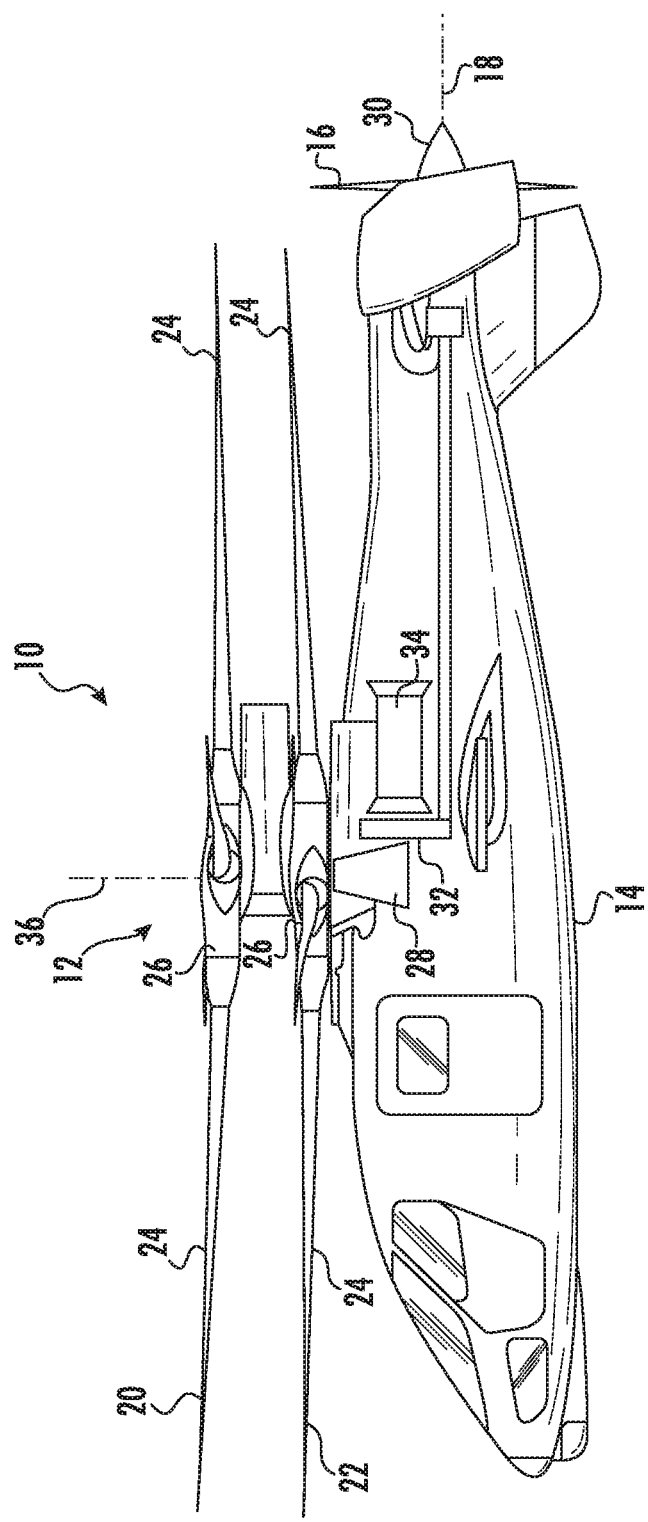
FIG. 1 is a side view of an example of a rotary wing aircraft

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis 36. The aircraft 10 includes an airframe 14 which supports the dual, contra-rotating, coaxial main rotor system 12 as well as a translational thrust system 16 which provides translational thrust generally parallel to an aircraft longitudinal axis 18.

The main rotor system 12 includes an upper rotor system 20 and a lower rotor system 22 as dual contra-rotating main rotors in a coaxial configuration. A plurality of rotor blades 24 is mounted to a rotor hub assembly 26 of each rotor system 20, 22. The main rotor system 12 is driven by a transmission 28. The translational thrust system 16 may be any propeller system including, but not limited to a pusher propeller, a tractor propeller, a nacelle mounted propeller, etc. In the example of FIG. 1, the translational thrust system 16 includes an auxiliary propulsor 30. In an embodiment, the auxiliary propulsor 30 is a pusher propeller system with a propeller rotational axis oriented substantially horizontal and parallel to the aircraft longitudinal axis 18 to provide thrust for high speed flight. The translational thrust system 16 may be driven through a main gearbox 32 which also drives the main rotor system 12.

The transmission 28 includes the main gearbox 32 driven by one or more engines, illustrated schematically at 34. The main gearbox 32 and engines 34 are considered as part of the non-rotating frame of the aircraft 10. In the case of a rotary wing aircraft, the main gearbox 32 may be interposed between one or more gas turbine engines 34, the main rotor system 12 and the translational thrust system 16. In one embodiment, the main gearbox 32 is a split torque gearbox which carries torque from the engines 34 through a multitude of drivetrain paths. Although a particular rotary wing aircraft configuration is illustrated and described in the disclosed non-limiting embodiment, other configurations and/or machines with rotor systems are within the scope of the present invention. It is to be appreciated that while the description herein relates to a rotary wing aircraft with a dual coaxial contra-rotating rotor system, the disclosure herein may be as readily applied to other rotor systems, such as turboprops, tilt-rotors, and tilt-wing aircraft, or a conventional single rotor system.

Figure 2:
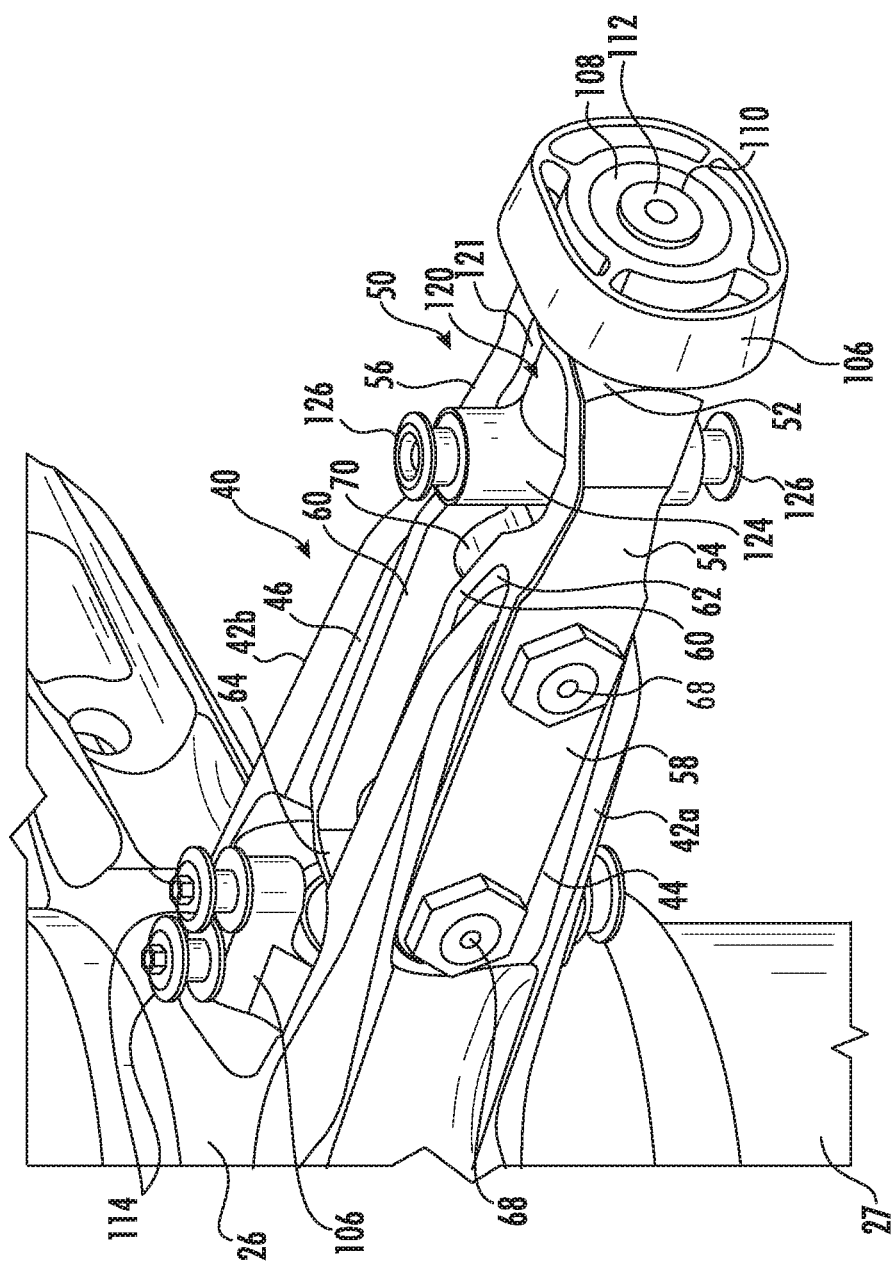
FIG. 2 is a perspective view of a portion of a rotor hub and a portion of a rotor blade assembly according to an embodiment.

Referring now to FIG. 2, a portion of a rotor hub assembly 26 is illustrated in more detail. As shown, the hub assembly 26 includes an open rotor hub designed to facilitate access to and service of components within the interior of the rotor shaft 27. The rotor hub assembly 26 includes a plurality of similar rotor members 40 mounted about a circumference of a base plate (not shown). Each rotor member 40 is defined by a pair of hub arms 42a, 42b extending radially outwardly from the rotor axis and separated from one another by a clearance. A rotor blade 24 may be secured at each rotor member 40.

Figure 3:
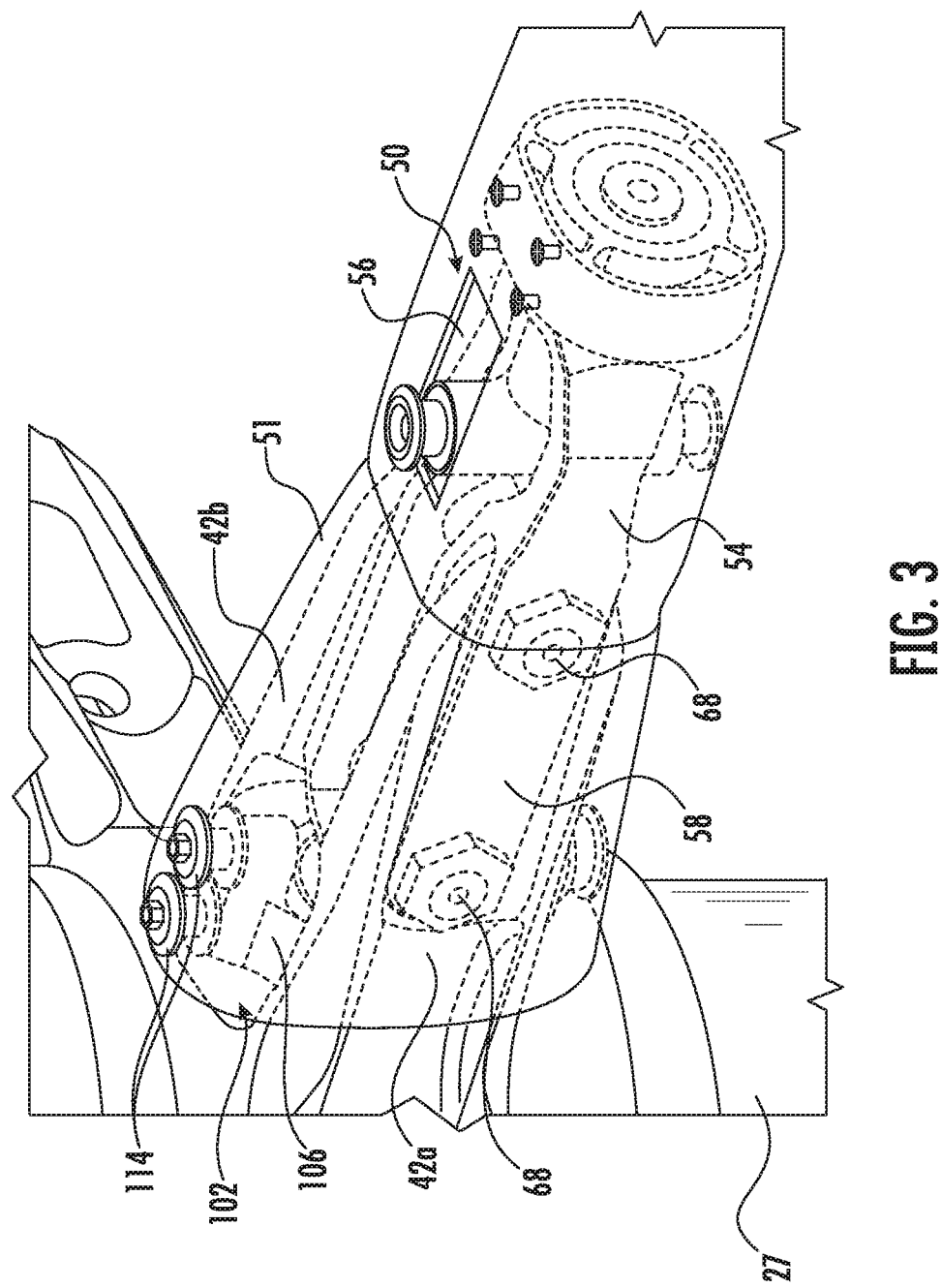
FIG. 3 is a perspective view of a portion of a rotor hub and a portion of a rotor blade assembly according to an embodiment.

The rotor blade 24 includes a structural member 50 and a rotor blade (not shown) secured to and supported by the structural member 50. A torque tube or spar 51, best shown in FIG. 3, is typically positioned in an overlapping arrangement with the hub arms 42a, 42b and the structural member 50. The rotor blade 24, for example having an airfoil shaped cross-section, is secured to the spar 51 and extends outwardly along a rotor blade axis to a blade tip. The spar 51 is connected to the hub arms 42a, 42b and the structural member 50 by a pitch bearing assembly including an inboard pitch bearing 102 and an outboard pitch bearing 104, to be described in more detail below.

The structural member 50 may be formed from a metal or composite material and includes a first, outboard end 52. A first arm 54 and a second arm 56 extend in a direction away from the first end 52, towards the rotor hub assembly 26. The first arm 54 of the structural member 50 is configured to couple to a first hub arm 42a and the second arm 56 of the structural member 50 is connectable to a second hub arm 42b of the pair of hub arms 42a, 42b of a rotor member 40. In an embodiment, the first arm 54 and the second arm 56 of the structural member 50 are substantially identical and are spaced apart from one another by a distance.

In an embodiment, each of the first arm 54 and the second arm 56 has a clevis configuration including an outer arm 58 and an inner arm 60 separated from one another by a clearance 62. The clearance 62 may be sized to receive at least a portion of one of the plurality of hub arms 42a, 42b therein. Accordingly, when the structural member 50 is connected to the rotor hub assembly 26, the outer arm 58 of the first arm 54 is arranged adjacent an exterior surface 44 of the first hub arm 42a and an inner arm 60 of the first arm 54 abuts the interior surface 45 of the first hub arm 42a. Similarly, the inner arm 60 of the second arm 56 is arranged adjacent an interior surface 46 of the second hub arm 42b and the outer arm 58 of the second arm 56 is arranged adjacent an exterior surface 47 of the second hub arm 42b. Accordingly, the clearance between the first hub arm 42a and the second hub arm 42b is generally equal to the width of the inner arms 60 and the distance between the inner arms 60.

Figure 4:
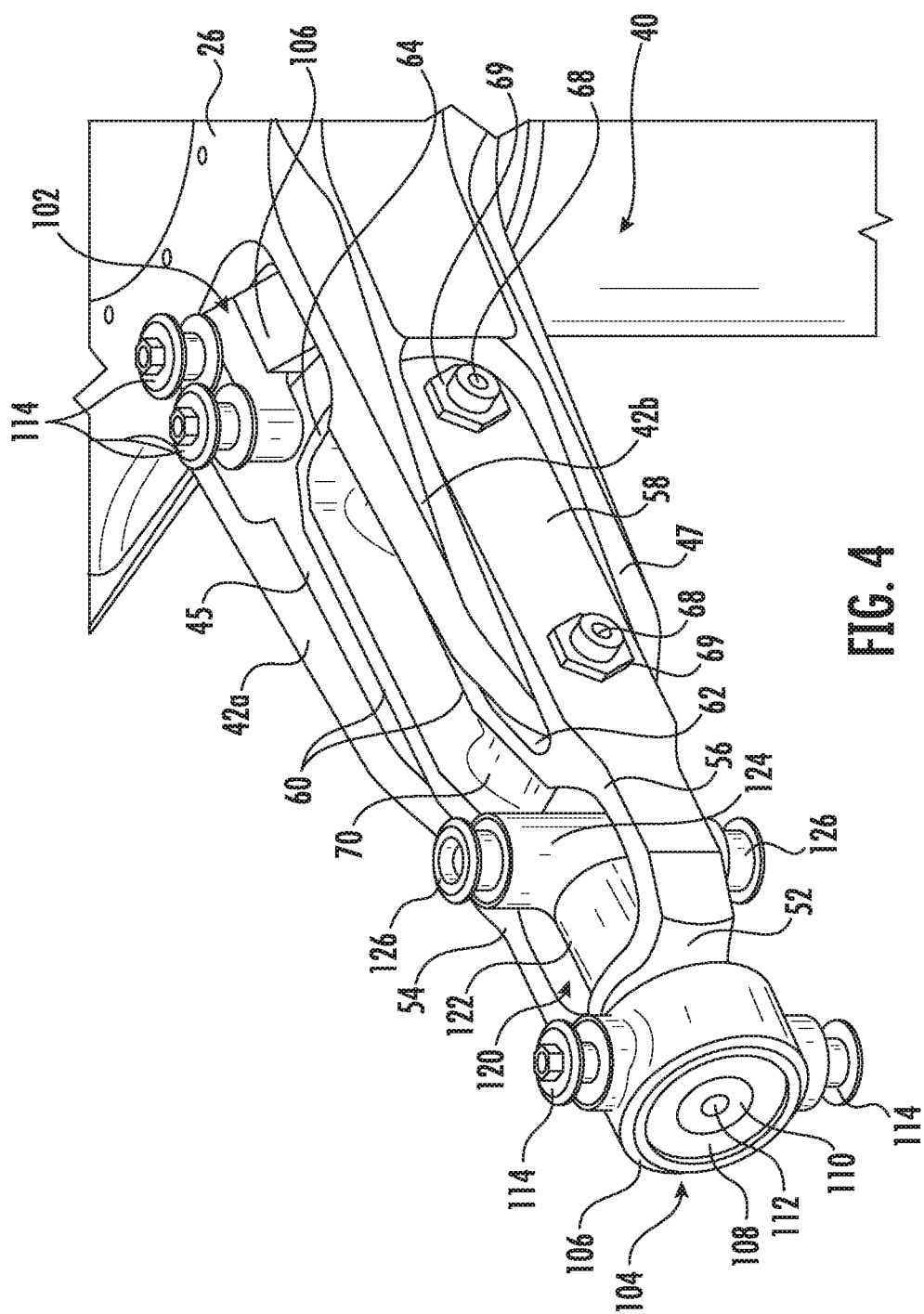
FIG. 4 is a perspective view of a portion of a rotor hub and another portion of a rotor blade assembly according to an embodiment.

In an embodiment, the inner arms 60 of both the first arm 54 and the second arm 56 of the structural member 50 are connected together at an inboard end 64 thereof. For example, the inboard end 64 of the inner arms 60 may be integrally formed with one another. Alternatively, as best shown in FIG. 4, the structural member 50 may include a web 66 that extends between the inner arms 60 of the first and second arm 54, 56. The web 66 may extend over only a portion of the length, or in some embodiments, the entire length of the inner arms 60.

As shown, each arm 54, 56 of the structural member 50 is connectable to an adjacent hub arm 42a, 42b, such as with one or more fasteners 68 for example. Accordingly, each arm 54, 56 of the structural member 50 has one or more openings (not shown) formed therein for receiving the one or more fasteners 68. In the illustrated, non-limiting embodiment, two fasteners 68 are used to affix each arm 54, 56 to a respective hub arm 42a, 42b. However, embodiments including only a single fastener 68, or alternatively, more than two fasteners 68 are also contemplated herein. The openings of each arm 54, 56 may be arranged in axial alignment with the one or more openings formed in the first hub arm 42a and the second hub arm 42b, respectively. In an embodiment, an opening may extend axially through not only the first arm 54, but also the second arm 56 of the structural member 50. Accordingly, a single fastener 68 may be used to couple the inner and outer arms 58, 60 of both the first and second arm 54, 56 of the structural member 50 to the first and second hub arms 42a, 42b.

For example, as shown, a head of the fastener 68 may be positioned adjacent an outer arm 58 of the first arm 54, and a nut 69 is connected to the fastener 68 adjacent the outer arm 58 of the second arm 56. In some embodiments, the structural member 50 may additionally include a structural channel 70 defining a bore (not shown) extending between openings formed in the inner arms 60. Although the structural member 50 is illustrated and described as a component separate from and connectable to the rotor hub assembly 26, it should be understood that in other embodiments, all or at least a portion of the structural member 50 may be integrally formed within the rotor hub assembly 26, such as with the plurality of hub arms 42a, 42b for example.

As noted above, the spar 51 is positioned and supported relative to the structural member 50 and the hub arms 42a, 42b by a pitch bearing assembly 100. In an embodiment, the pitch bearing assembly 100 includes a first, inboard pitch bearing 102 arranged adjacent the inboard end 64 of the structural member 50 and a second, outboard pitch bearing 104 arranged adjacent the outboard end 52 of the structural member 50. Each of the inboard pitch bearing 102 and the outboard pitch bearing 104 includes a body 106 for connection to a portion of a spar 51, one or more bearing elements 108, and a central bore 110. Axial and radial forces are exerted on the bearings 102, 104 by the motion and the weight of the rotor blade. As shown, the one or more bearing elements 108 may be formed from a lightweight elastic material such as such as a rubber or other polymeric material, or nonpolymer elastic material, such as a metal, or combinations of polymer and nonpolymer materials, such as an arrangement of layers of elastomeric material metallic shim material there between. In other embodiments, the one or more bearing elements 108 may include roller or needle elements made of steel, ceramic, etc and movable about an axis between the body 106 and an inner sleeve or race (not shown).

A respective portion of the structural member 50 is receivable within the central bore 110 of each of the inboard pitch bearing 102 and the outboard pitch bearing. For example, a first protrusion (not shown) extending outwardly from the inboard end 64 of the structural member 50 is received within the central bore 110 of the inboard pitch bearing 102 and a second protrusion 112 extending inwardly from the outboard end 52 of the structural member 50 is received within the central bore 110 of the outboard pitch bearing 104.

Figure 5:
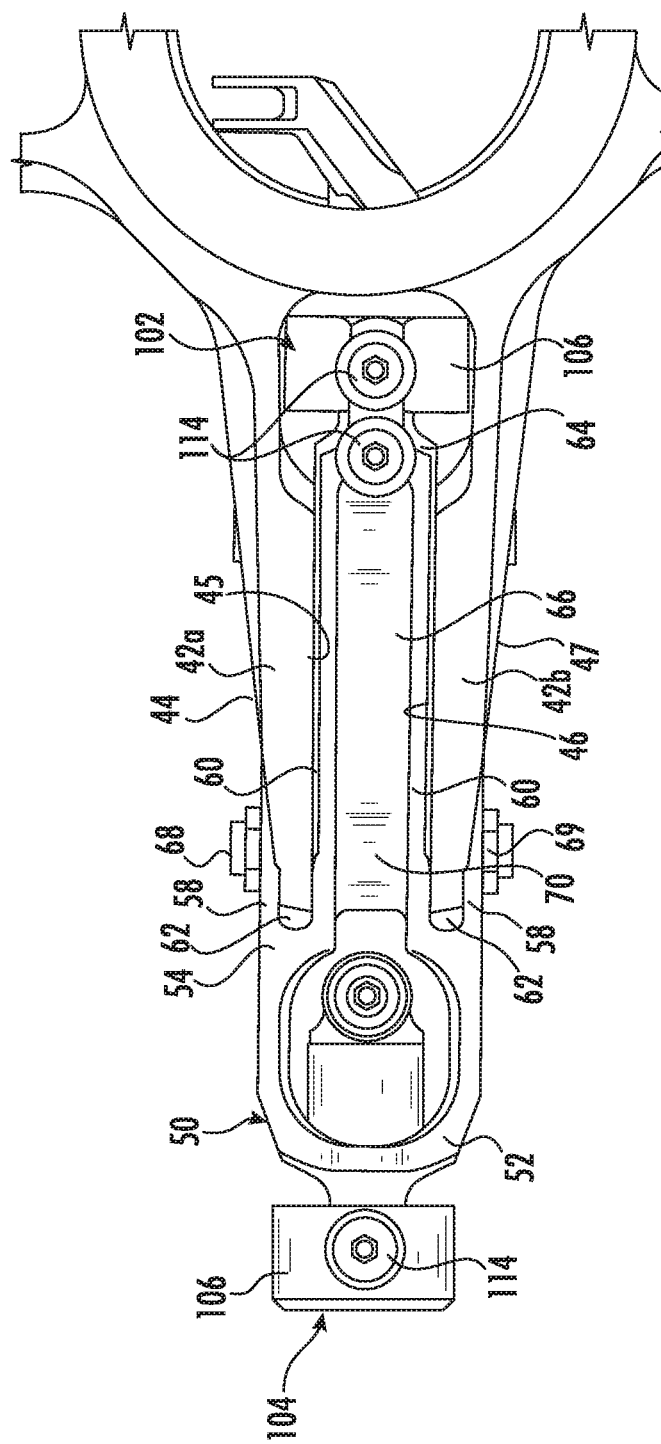
FIG. 5 is a plan view of the portion of the rotor hub and the portion of the rotor blade assembly shown in FIG. 4 according to an embodiment.

Further, the structural member 50 is connected to the spar 51 at one or more connection points defined at an interface between the body 106 of the bearing assemblies 102, 104 and the spar 51. These connection points may be located vertically above and/or below each of the bearings 102, 104. In an embodiment, best shown in FIGS. 4 and 5, the body 106 of each pitch bearing 102, 104 includes two mounting ends 114 that form the connection points with the spar 51. These mounting ends 114 may be bolted or otherwise fastened to opposite sides of the spar 51. However, other suitable mechanisms for connecting the pitch bearings 102, 104 to the spar 51 are also contemplated herein. In the non-limiting embodiment of FIGS. 2 and 3, a contour and/or diameter of the body 106 of the outboard pitch bearing 104 is substantially equal to an interior surface of the spar 51. As a result, an interface is defined between at least a portion of the periphery of the body 106 of the outboard pitch bearing 104 and a surface of the spar 51. In addition, one or more fasteners may be used to couple to body 106 of the outboard pitch bearing 104 to the spar 51.

The pitch bearings 102, 104 allow the spar 51 to rotate about the blade axis for pitch adjustment during operation of the rotor in response to a pilot input. During this pitch operation, the structural member 50 and the fasteners 68 connecting the structural member 50 to the hub arms 42a, 42b hold the structural member 50 in place with respect to the hub assembly 26. Additionally, the pitch bearings 102, 104 to transmit loads acting on the main rotor blades to the hub assembly 26.

In existing rotor blade applications, the outboard pitch bearing is located at a position inboard of an outboard end of the structural member or flexbeam. As a result, the distance between inboard and outboard pitch bearings is about 20 inches. By positioning the outboard pitch bearing 104 at the outboard end 52 of the structural member 50 as illustrated and described herein, the total distance between the inboard pitch bearing 102 and the outboard pitch bearing 104 is increased, such as to a distance greater than 22 inches for example. In an embodiment, the distance between the inboard pitch bearing 102 and the outboard pitch bearing 104 is equal to or greater than about 25 inches, such as 25.75 inches for example. The distance between the inboard pitch bearing and the outboard pitch bearing, may alternatively be expressed as a percentage of a blade radius. In an embodiment, the ratio of the distance between the pitch bearing is greater than about 9.5%, such as about 10%, 10.5%, 11%, 11.5%, 12%, 12.5%, or 13% of the blade radius for example. In embodiments where the distance between the pitch bearings is about 25 inches and the blade radius is 245 inches, the ratio is about 10.2% for example, and in embodiments where the distance is 25.75 inches, the ratio is about 10.6% for example.

The rotor blade 24 additionally includes a centrifugal assembly including a centrifugal bearing 120 arranged between the inboard and the outboard pitch bearings 102, 104. As shown, the centrifugal assembly is positioned within an opening 121 defined between the outboard end 52 of the structural member 50 and the first and second arms 54, 56. The opening 121 is arranged outboard of the web 66 extending between the inner arms 60 of the first and second arms 54, 56. The centrifugal bearing 120 includes one or more bearing elements 122 extending between a surface of the structural member 50 and a centrifugal pin 124 connected to an opposite end of the one or more bearing elements 122. Similar to the bearing elements previously described herein, in an embodiment, the bearing element 122 may be formed from a lightweight elastic material, a nonpolymer elastic material, or a combination thereof. The centrifugal pin 124 is oriented generally perpendicular to the blade axis. In the illustrated, non-limiting embodiment, the centrifugal pin 124 is oriented parallel to the bodies 106 of the inboard and outboard pitch bearings 102, 104. The centrifugal pin 124 similarly includes at least one mounting end 126 that forms a connection point with the spar 51. In the illustrated, non-limiting embodiment, the centrifugal pin 124 includes a first mounting end 126 that defines an upper connection point arranged adjacent a first side of the structural member 50, and a second mounting end 126 that defines a lower connection point arranged adjacent a second, opposite side of the structural member 50. However, embodiments of the centrifugal pin 124 including additional mounting ends 126 that define additional connection points with the spar 51 are also contemplated herein.

Although the bearing element of the centrifugal bearing 120 is arranged in contact with a surface of the structural member 50 opposite the outboard pitch bearing 104, the centrifugal bearing is not connected to the structural member 50. Rather, the centrifugal bearing 120 and pin 124 remain at a desired position relative to the structural member via the engagement of the mounting ends 126 with the spar 51.

The centrifugal force acting on the rotor blade as a result of the rotation of the rotor blade about the rotor axis, causes the deformable material of the bearing element to compress. In an embodiment, the shims that form the elastomeric bearing element guide the deformation thereof such that the displacement trajectory of the spar 51 relative to the structural member is a predefined coupled spanwise translation.

Existing rotor blade assembly, use a tension torsion strap which is positioned within the inner diameter of the pitch bearings. As a result, the size of the pitch bearings is increased, resulting in a larger rotor blade assembly and increased weight. However, the positioning of the centrifugal bearing 120 as described herein allows for a compact configuration of the bearings, while increasing the distance between the inboard and outboard pitch bearings 102, 104. In addition to the increased distance between the inboard and outboard pitch bearings 102, 104, the rotor blade 24 illustrated and described herein has a simplified structure and therefore a reduced total number of parts. As a result, the total amount of time required to install or remove the blade has been diminished. Additionally, the assembly illustrated and described herein may be used in existing aircraft for modernization and/or retrofit purposes. This assembly allows for improved aerodynamic performance as a result of a reduced inboard height of the rotor blade, as well as improved loading across the rotor hub assembly 26.

What is claimed is:

1. A rotor blade assembly of an aircraft having a rotor hub, comprising:
   a structural member having an inboard end and an outboard end, the structural member being connectable with the rotor hub;
   a spar surrounding the structural member and extending at least partially along a rotor blade axis;
   a pitch bearing assembly supportive of the spar relative to the structural member, the pitch bearing assembly including:
      an inboard pitch bearing mounted to the inboard end of the structural member; and
      an outboard pitch bearing mounted to the outboard end of the structural member; and
   a centrifugal assembly including a centrifugal bearing, the centrifugal bearing being disposed between the inboard pitch bearing and the outboard pitch bearing relative to the rotor blade axis.

2. The rotor blade assembly of claim 1, wherein the structural member includes a first arm and a second arm extending from the outboard end toward the inboard end.

3. The rotor blade assembly of claim 2, wherein each of the first arm and the second arm has a clevis configuration including a respective outer arm and inner arm separated by a clearance.

4. The rotor blade assembly of claim 3, wherein a portion of the rotor hub is receivable within the clearance.

5. The rotor blade assembly of claim 3, wherein the structural member includes a web that extends between the inner arm of the first arm and the inner arm of the second arm.

6. The rotor blade assembly of claim 2, wherein the first arm is connected to a portion of the second arm adjacent the inboard end.

7. The rotor blade assembly of claim 1, wherein the structural member is integrally formed with the rotor hub.

8. The rotor blade assembly of claim 1, further comprising a rotor blade secured to and supported by the structural member.

9. The rotor hub of claim 1, wherein a distance between the inboard pitch bearing and the outboard pitch bearing measured parallel to the rotor blade axis is greater than 9.5% of a radius of the rotor blade assembly.

10. The rotor hub of claim 9, wherein the distance between the inboard pitch bearing and the outboard pitch bearing measured parallel to the rotor blade axis is greater than 10% of the radius of the rotor blade assembly.

11. The rotor hub of claim 10, wherein the distance between the inboard pitch bearing and the outboard pitch bearing measured parallel to the rotor blade axis is about 10.5% of the radius of the rotor blade assembly.

12. A rotary wing aircraft comprising:
   an airframe;
   a main rotor system rotatable about a rotor axis, the main rotor system including:
      a rotor hub; and
      at least one rotor blade assembly affixed to the rotor hub, the at least one rotor blade assembly including:
         a structural member having an inboard end and an outboard end, the structural member being connectable with the rotor hub;
         a spar surrounding the structural member and extending at least partially along a rotor blade axis;
         a pitch bearing assembly supportive of the spar relative to the structural member; and
         a centrifugal assembly including a centrifugal bearing, the centrifugal bearing being disposed inboard of a portion of the pitch bearing assembly relative to the rotor blade axis;
      wherein the pitch bearing assembly includes an inboard pitch bearing and an outboard pitch bearing and the centrifugal bearing is disposed inboard of the outboard pitch bearing.

13. The rotary wing aircraft of claim 12, wherein the inboard pitch bearing is mounted to the inboard end of the structural member and the outboard pitch bearing is mounted to the outboard end of the structural member.

14. The rotary wing aircraft of claim 13, wherein a distance between the inboard pitch bearing and the outboard pitch bearing measured parallel to the rotor blade axis is greater than 9.5% of a radius of the rotor blade assembly.

15. The rotary wing aircraft of claim 12, wherein the structural member is integrally formed with the rotor hub.

16. A rotor blade assembly comprising:
- a structural member having an inboard end and an outboard end, the structural member comprising a first arm and a second arm extending from the outboard end toward the inboard end, and wherein each of the first arm and the second arm has a clevis configuration including a respective outer arm and inner arm separated by a clearance;
- a spar surrounding the structural member and extending at least partially along a rotor blade axis;
- a pitch bearing assembly supportive of the spar relative to the structural member, the pitch bearing assembly including:
  - an inboard pitch bearing mounted to the inboard end of the structural member; and
  - an outboard pitch bearing mounted to the outboard end of the structural member, wherein a distance between the inboard pitch bearing and the outboard pitch bearing measured along the rotor blade axis is greater than 22 inches.

17. The rotor blade assembly of claim 16, wherein the distance is greater than 25 inches.

18. The rotor blade assembly of claim 16, wherein the distance is 25.75 inches.

19. The rotor blade assembly of claim 16, wherein the rotor blade assembly further comprises a centrifugal assembly including a centrifugal bearing, the centrifugal bearing being disposed inboard of the outboard pitch bearing.

\* \* \* \* \*